United States Patent Office 3,541,064
Patented Nov. 17, 1970

3,541,064
HYDROGENATION CATALYSTS AND A PROCESS FOR HYDROGENATING POLYMERS BY THE USE OF THEM
Toshio Yoshimoto, Seiya Kaneko, Tsuneaki Narumiya, and Hiroshi Yoshii, Tokyo, Japan, assignors to Bridgestone Tire Company Limited, Tokyo, Japan
No Drawing. Filed July 11, 1968, Ser. No. 743,929
Int. Cl. C08d 5/00; C08f 27/25
U.S. Cl. 260—85.1    17 Claims

ABSTRACT OF THE DISCLOSURE

A process for catalytic hydrogenation of a polymer having hydrogenatable unsaturated bond comprises reacting said polymer in a viscous solution form with hydrogen in the presence of a soluble catalyst obtained by mixing (1) at least one organic compound of nickel, cobalt or iron, wherein the organic radicals are attached to the metal only through oxygen atoms and (2) at least one organometallic compound of lithium or magnesium.

---

The present invention relates to a new hydrogenation catalyst and a process for hydrogenating polymers by the use of said catalyst.

In order to hydrogenate polymers efficiently by the use of ordinary heterogeneous reduced metal catalysts such as Raney nickel and nickel kieselguhr, it was necessary to use a large amount of catalysts, high reaction temperature of from 150° to 200° C. or higher and high hydrogen pressure, because a solution of polymers is highly viscous compared with that of low molecular weight compounds. It was also demerit that these high temperature hydrogenation conditions cause the degradation of polymers. Further, these heterogeneous catalysts are not suitable for hydrogenation of polymers, because they are easily poisoned by impurities which are difficult to be removed from and also it is very difficult to remove such a heterogeneous catalyst residue from hydrogenated polymers after hydrogenation.

It is an object of this invention, therefore, to provide a new stable catalyst with high activity suitable for the hydrogenation of polymers in a viscous solution form. Another object of the invention is to provide a new process suitable for hydrogenating polymers in a viscous solution form. A further object of the invention is to provide new hydrogenated polymers suitable for manufacturing the rubber articles. Other and further objects of the invention will become apparent to those skilled in the art upon consideration of the accompanying disclosure.

We have found that the hydrogenation of polymers having hydrogenatable unsaturated bonds can be carried out by the use of the soluble catalyst comprising the reaction product of (1) an organic compound of nickel, cobalt or iron and (2) an organometallic compound of lithium or magnesium.

The catalyst of the present invention can effect the hydrogenation of polymers under mild conditions such as at a low temperature and under a low hydrogen pressure with a high activity which has never been obtained. It became also apparent that the catalyst of the present invention is suitable for the selective hydrogenation of olefinically unsaturated bonds, especially butadienic units, because the reaction proceeds easily at room temperature and under an atmospheric pressure of hydrogen. Further, the catalyst of the present invention is easily removed from the hydrogenated polymers.

The first component of the catalyst is an organic compound of the transition metal such as nickel, cobalt or iron. The organic compounds, of which organic radicals are attached to the metal only through oxygen atoms are preferably used. The organic compounds, of which organic radicals consist of hydrogen, oxygen and carbon atoms, are more preferably used. Among those, one of preferable compounds is a metal carboxylate having the formula $(R'COO)_{n'}M'$, wherein $M'$ is a metal selected from the group consisting of nickel, cobalt and iron, $R'$ is a hydrocarbon radical having 1 to 50 carbon atoms, preferably from 5 to 30 carbon atoms and $n'$ is a valence number of $M'$. These metal carboxylates include nickel, cobalt and iron salts of hydrocarbon aliphatic acids, hydrocarbon aromatic acids and hydrocarbon cycloaliphatic acids. Examples of hydrocarbon aliphatic acids include a hexanoic acid, a 2-ethylhexanoic acid, a heptanoic acid, an octanoic acid, a nonanoic acid, a decanoic acid, a dodecanoic acid, a myristic acid, a palmitic acid, a stearic acid, a dodecenoic acid, an oleic acid, a linoleic acid, a rhodinic acid and the like. Examples of hydrocarbon aromatic acids include benzoic acid and alkyl-substituted aromatic acids in which alkyl has from 1 to 20 carbon atoms. These include t-butyl, 2-ethylhexyl-, dodecyl- and nonylbenzoic acids and the like. Examples of cycloaliphatic acids include naphthenic acid, cyclohexylcarboxylic acid, abietic type resin acid and the like. Commercially available metallic soaps such as naphthenic acid salts, rosin acid salts, linoleic acid salts, oleic acid salts, stearic acid salts and tall oil salts may be used.

Other preferable organic compounds are a metal chelate compound. As the chelating agents which can chelate with the metal such as nickel, cobalt or iron, $\beta$-ketones, $\alpha$-hydroxycarboxylic acids, $\beta$-hydroxycarboxylic acids and $\beta$-hydroxycarbonyl compounds may be used. Examples of the $\beta$-ketones include acetylacetone, 1,3-hexanedion, 3,5-nonadione, methylacetoacetate, ethyl acetoacetate and the like. Examples of the $\alpha$-hydroxycarboxylic acids include lactic acid, glycolic acid, $\alpha$-hydroxyphenylacetic acid, $\alpha$-hydroxy-$\alpha$-phenylacetic acid, $\alpha$-hydroxycyclohexylacetic acid and the like. Examples of the $\beta$-hydroxycarboxylic acids includes salicyclic acid, alkyl-substituted salicyclic acid and the like. Examples of the $\beta$-hydroxylcarbonyl compounds include salicylaldehyde, o-hydroxyacetophenone and the like. Examples of the metal chelate compounds having the above described chelating agents include bis(acetylacetone)nickel, tris(acetylacetone)cobalt, bis(ethyl acetoacetate)nickel, bis(ethyl acetoacetate)cobalt, bis(3,5-diisopropylsalicyclic acid)nickel, bis(salicylaldehyde)nickel, bis(salicylaldehyde)cobalt and the like.

In addition to the above described organic compounds, a metal alkoxide may be used. Examples of the metal alkoxides include ferric triisopropoxide, ferric tri-n-butoxide, cobaltous diethoxide, cobaltous di-n-butoxide and cobaltous di-n-amyloxide and the like. Further metal sulfonates such as nickel, cobalt and iron salts of benzene sulfonic acid, p-toluene sulfonic acid and alkyl-benzene sulfonic acids such as dodecylbenzene sulfonic acid may be used.

In order to obtain the catalyst with a high activity characterizing the present invention, the organic compounds dehydrated and soluble in an inert solvent are preferably used.

The second component of the catalyst is an organometallic compound of lithium or magnesium. The organometallic compounds having the formula of $MR_n$, wherein M is a metal selected from the group consisting of lithium and magnesium, R is a hydrocarbon radical having from 1 to 12 carbon atoms and $n$ is the valence number of M, are preferably used.

The hydrocarbon radicals include an alkyl, aryl, alkaryl and cycloaliphatic group. Examples of the radicals include methyl, ethyl, n-propyl, i-propyl, n-butyl, i-butyl, sec-butyl, t-butyl, pentyl, hexyl, heptyl, octyl, nonyl, dodecyl, phenyl, benzyl, tolyl, cyclopentyl, cyclohexyl, cycohexenyl and naphthyl radical.

Examples of the organometallic compounds include ethyllithium, n-propyllithium, n-butyllithium, i-butyllithium, sec-butyllithium, t-butyllithium, n-pentyllithium, n-hexyllithium, phenyllithium, diethylmagnesium, di-n-propylmagnesium, di-n-butylmagnesium, diphenylmagnesium and the like. These exemplifications do not restrict the scope of the organometallic compounds which can be used as the catalytic component of the present invention. Among the above described organometallic compounds, $MgR_2$ is more preferably used because it can be easily synthesized by Grigniard reagent. An alkyl lithium compound and a dialkyl magnesium compound are also more preferably used, because they form the catalyst with a high activity according to the present invention.

The catalyst of the present invention may be obtained by mixing the above described organic compound with the organometallic compound in an inert solvent or in a polymer solution to be hydrogenated. When the organic compound is reacted with the organometallic compound in an inert solvent, the initial color of the organic compound turns to dark brown or black and it is observed that a new reaction product is formed and a homogeneous catalyst solution can be obtained.

When this homogeneous catalyst solution is mixed with the polymer solution to be hydrogenated, the homogeneous polymer solution containing the catalyst is obtained. Therefore, the catalyst can make the most homogeneous contact with polymers and hydrogen, and then the hydrogenation proceeds rapidly under a mild condition. When the catalytic components are reacted in the polymer solution to be hydrogenated, the homogeneous polymer solution containing the catalyst can be also obtained. The soluble catalyst of the present invention cannot be separated from the polymer solution by ultracentrifugation. Further, it is presumed that the active species of the catalyst of the present invention is not in such metallic state as in reduced metallic nickel catalyst, because the activity of the catalyst decreases remarkably, when it is treated with a polar solvent such as acetone and alcohol.

The molar ratio of the organic compound to the organometallic compound can be varied widely. However, when the molar ratio of the organic compound to the organometallic compound is below 1:10 or above 1:0.2 the catalyst is low in the activity. The molar ratio of between 1:0.2 and 1:10 is preferably used. The molar ratio of between 1:0.8 and 1:8 is more preferably used.

When the catalyst is prepared by using an insoluble or a partially soluble organic compound or the catalyst is kept at a high temperature for a long time after mixing two catalytic components in an inert solvent in a large molar ratio of the organic compound to the organometallic compound, the catalyst solution contains often a deposit. Such catalyst containing a deposit is lower in the activity than the soluble catalyst of the present invention, when it is utilized for hydrogenation of polymers in a mild condition. Further, when zinc diethyl, which has similar properties to $MgR_2$, is used instead of $MgR_2$, the dark brown or black solution similar to the catalyst solution of the present invention is obtained, but it never has the activity of the hydrogenation catalyst. These facts show that the catalyst of the present invention has an unexpected function.

As an inert solvent used for preparing the catalyst or dissolving the polymer to be hydrogenated, saturated hydrocarbon, aromatic hydrocarbon, hydroaromatic hydrocarbon, chlorinated aromatic hydrocarbon, and ether may be used. Examples of such inert solvent include hexane, heptane, octane, benzene, toluene, xylene, cyclohexane, methylcyclohexane, decalin, tetraline, chlorobenzene, tetrahydrofuran, anisole, dioxane and their mixtures. Among them saturated hydrocarbon, aromatic hydrocarbon and hydroaromatic hydrocarbon are preferably used.

The catalyst of the present invention is used for the hydrogenation of polymers having the unsaturated bonds in a viscous solution form. The hydrogenatable unsaturated bonds according to the present invention include carbon-carbon double bond, carbon-carbon triple bond and carbon-nitrogen triple bond. Diene polymers having such hydrogenatable unsaturated bonds are preferably employed in the present invention. Such diene polymers include homopolymer and copolymer of conjugated diene, and copolymer of conjugated diene and unsaturated compound which can be copolymerized with conjugated diene such as vinyl-substituted aromatic hydrocarbon. Examples of such polymers include polybutadiene, polyisoprene, butadiene-styrene copolymer, butadiene-$\alpha$-methylstyrene copolymer, butadiene-isoprene copolymer, polybutadiene grafted with a minor amount of styrene, butadiene-acrylonitrile copolymer, butadiene-vinylpyridine copolymer and others. The polymers obtained from butadiene are preferably used, because the hydrogenation of butadienic units proceeds under mild conditions. These polymers may be prepared by bulky polymerization, solution polymerization or emulsion polymerization by the use of a radical type initiator, an ionic type initiator or a Ziegler type initiator. The polymers having Mooney viscosity at 100° C. of more than 20 can be easily hydrogenated according to the present invention. The hydrogenated polymers obtained from the polymers having such a high Mooney viscosity are useful for manufacturing rubber articles.

The catalyst of the present invention has so high activity for the hydrogenation of olefinically unsaturated bonds of polymers that the complete hydrogenation can be carried out under mild conditions, such as atmospheric pressure of hydrogen and near room temperature in a short time. Further, the aromatic nuclei can be hydrogenated under more severe condition.

The pressure of hydrogen to be used in the hydrogenation may be varied widely, but the selective hydrogenation of olefinically unsaturated bonds can be carried out at a temperature of from 0° to 120° C. and under a hydrogen pressure of less than 10 atm. When the temperature is lower than 0° C., the hydrogenation rate is too slow and on the other hand, when the temperature is higher than 120° C., the degradation of the polymeric chain often occurs. It is one of merits of the present invention that the selective hydrogenation of the unsaturated bonds of polymers proceeds easily in a viscous solution or in a high activity.

According to the invention, the concentration of polymers in a solution to be hydrogenated may be varied from 1 to 30 percent by weight, preferably from 1 to 25 percent. The viscosity of the polymer solution may be varied widely. From 0.05 to 5,000 poise, preferably from 1 to 2,000 poise, may be employed.

After the hydrogenation, the removal of solvent and catalyst from the hydrogenated polymers is easily carried out by adding a polar solvent, such as acetone and alcohol to the reaction mixture and precipitating the polymer, or pouring the reaction product into a steam or a hot water and removing solvent by azeotropic distillation.

In these procedures, the catalyst is decomposed and the major part of the catalyst is removed from the polymer, but the most effective removal of the catalyst is attained by contacting the reaction mixture with a polar solvent or water containing a small amount of acid.

According to the present invention, the polymers of high Mooney viscosity even more than 40 can be easily hydrogenated under the mild condition wherein a side reaction such as thermal degradation or gelation does not occur, and so the obtained polymer has no inferior properties resulted from the decrease of molecular weight or gel. For example, the hydrogenated styrene-butadiene random copolymer has a higher green strength, a resilience, an oil extendability and a heat resistance than the starting styrene-butadiene copolymer.

This hydrogenated polymer has also property of roll processibility, extrusion or high filler loading. The hydrogenated polybutadiene obtained by the process of the invention has improved green strength and cold flow property and others.

These hydrogenated polymers of the present invention are easily curable by the conventional procedure and may be applied to the production of rubber articles.

The invention is illustrated in the greater detail in the following examples which are not intended, however, to be unduly limitative of the invention.

EXAMPLE 1

In a shakable glass reactor of 300 ml. capacity, 100 ml. of polymer solution in toluene was placed. After the atmosphere of the reactor was displaced by hydrogen, 0.4 mmol of nickel naphthenate and 1.6 mmol of n-butyllithium were mixed with the polymer solution and then hydrogen of an atmospheric pressure was contacted with the solution and an amount of hydrogen absorbed was measured continuously by a gas burette.

When the catalytic components were mixed with the polymer solution, the color of the solution turned to dark brown and then to black and it was observed that the catalyst was soluble in the polymer solution. As soon as the reactor was shaken, hydrogen was absorbed rapidly.

Reaction conditions and an amount of hydrogen absorbed in 10, 30 and 60 minutes are shown in the following Table 1.

The introduction of hydrogen was stopped after 60 minutes and acetone containing a small amount of hydrochloric acid was added to the polymer solution under stirring and then the solution was mixed with a large amount of acetone to precipitate the hydrogenated polymer. White, rubbery hydrogenated polymer having a high tensile strength was obtained after drying under a reduced pressure.

The infrared spectrum of the obtained hydrogenated polymer showed peaks at 721 cm.$^{-1}$ and 1,380 cm.$^{-1}$ assigned to $-(CH_2)_4-$ and $-CH_3$ of the hydrogenated butadienic units respectively and peaks at 699 cm.$^{-1}$ and 757 cm.$^{-1}$ assigned to phenyl radical of the styrenic unit in No. 1. The infrared spectrum also showed no peaks in the range of from 820 to 900 cm.$^{-1}$ assigned to cyclohexyl radical, which showed that the selective hydrogenation of butadienic units of the polymer was carried out.

The butadienic units are hydrogenated completely by about 1,720 ml. of hydrogen in No. 1 and about 1,230 ml. in No. 2 and No. 3 and therefore these results show that the degree of hydrogenation in 60 minutes was 85.4%, 85.3% and 74.4% respectively.

EXAMPLE 2

No. 1 in Example 1 was repeated by the user of different catalysts. The catalysts were prepared by mixing 0.6 mmol of nickel naphthenate with n-butyllithium as shown in the following table in toluene at 30° C. for 5 minutes. Then the solution containing 0.4 mmol of nickel was weighted out from the obtained homogeneous solution as the hydrogenation catalyst.

Results are shown in the following Table 2.

TABLE 2

| | n-Butyl-lithium, mmol. | Li/Ni, molar | Amount of hydrogen Absorbed, ml. | | |
|---|---|---|---|---|---|
| | | | 10 min. | 30 min. | 60 min. |
| Number: | | | | | |
| 4 | 0.4 | 1 | | 3 | 5 |
| 5 | 0.8 | 2 | 374 | 571 | 668 |
| 6 | 1.6 | 4 | 346 | 826 | 1,012 |
| 7 | 2.4 | 6 | 58 | 136 | 249 |
| 8 | 4.0 | 10 | 36 | 46 | 53 |

These results show that the catalyst with the highest activity can be obtained when the molar ratio of Li/Ni is about 4.

EXAMPLE 3

In the same reactor as used in Example 1, 100 ml. of 5 weight percent polymer solution in toluene was placed and the hydrogenation was carried out at 50° C. in the same manner as shown in Example 1.

TABLE 1

| Polymer | Polymer conc., wt. Percent | Temp. of hydrogenation, ° C. | Amount of hydrogen absorbed, ml. | | |
|---|---|---|---|---|---|
| | | | 10 min. | 30 min. | 60 min. |
| Number: | | | | | |
| 1 ............ Styrene-butadiene random copolymer [2] | 5 | 30 | 102 | 1,201 | 1,469 |
| 2 ............ Polybutadiene [3] | 3 | 50 | 760 | 992 | 1,049 |
| 3 ............ Polybutadiene [4] | 3 | 50 | 612 | 835 | 914 |

[1] Prepared by solution-polimerization.
[2] ST/BD=18/82, ML-4 at 100° C.=45.
[3] cis-1.4:96.2%, trans-1.4:2.8%, 1.2;1.0%, ML-4 at 100° C.=52.
[4] cis-1.4:35%, trans-1.4:55%, 1.2:10%, ML-4 at 100° C.=35.

The catalyst was prepared by mixing 0.4 mmol. of nickel naphthenate or cobalt naphthenate with 1.6 mmol. of diethylmagnesium in toluene for 5 minutes. Then, the solution containing 0.3 mmol. of nickel or cobalt was weighed out and used as the hydrogenation catalyst.

Results are shown in the following Table 3.

TABLE 3

| | Catalytic component | Temp. of catalyst preparation, ° C. | Polymer | Amount of hydrogen absorbed, ml. | | | |
|---|---|---|---|---|---|---|---|
| | | | | 10 min. | 30 min. | 60 min. | 120 min. |
| Number: | | | | | | | |
| 9 | Nickel naphthenate | 50 | Styrenebutadiene random copolymer [1] | 29 | 70 | 306 | 1,421 |
| 10 | do | 32 | Polybutadiene [2] | 18 | 77 | 352 | 1,827 |
| 11 | Cobalt naphthenate | 50 | do.[2] | 809 | 1,623 | 1,939 | |

[1] The same as used in No. 1.  [2] The same as used in No. 3.

EXAMPLE 4

Example 1 was repeated by using the different catalytic component instead of nickel naphthenate. The polymer concentration was 5 weight percent. Results are shown in the following Table 4.

TABLE 4

| No. | Catalytic component | Polymer | Temp. of hydrogenation, °C. | Amount of hydrogen absorbed, ml. | | |
|---|---|---|---|---|---|---|
| | | | | 10 min. | 30 min. | 60 min. |
| 12 | Bis(ethyl acetoacetate) nickel | Styrenebutadiene copolymer [1] | 50 | 405 | 985 | 1,233 |
| 13 | do | Polybutadiene [2] | 50 | 536 | 1,167 | 1,333 |
| 14 | Bis(acetylacetone) nickel | Polybutadiene [3] | 50 | 114 | 272 | 1,008 |
| 15 | Iron naphthenate | do.[3] | 26 | 375 | 536 | 563 |
| 16 | Nickel 2-ethylhexanoate | Styrenebutadiene copolymer [1] | 50 | 172 | 689 | 1,032 |
| 17 | Cobalt 2-ethylhexanoate | do.[1] | 50 | 153 | 739 | 993 |

[1] The same as used in No. 1.  [2] The same as used in No. 2.  [3] The same as used in No. 3.

What is claimed is:

1. A process for the catalytic hydrogenation of a polymer produced from a polymerizable monomer comprising conjugated diene, which comprises reacting unsaturated bonds of the polymer as a solution in an inert solvent selected from the group consisting of a saturated hydrocarbon, an aromatic hydrocarbon, a hydroaromatic hydrocarbon, a chlorinated aromatic hydrocarbon and an ether with hydrogen at a temperature of from 0 to 120° C. by the use of an effective amount of a catalyst soluble in said solution, the concentration of said polymer in said solution being from 1 to 30 percent by weight and said catalyst being obtained by mixing:
   (1) at least one organic compound selected from the group consisting of a metal carboxylate having the formula $(R'COO)_{n'}M'$, wherein $M'$ is a metal, $R'$ is a hydrocarbon radical having from 1 to 50 carbon atoms and $n'$ is a valence number of $M'$ and a metal chelate compound, chelating agents of which are $\beta$-ketones, $\alpha$-hydroxycarboxylic acids, $\beta$-hydroxycarboxylic acids, or $\beta$-hydroxycarbonyl compounds, wherein said metal is nickel, cobalt, or iron and
   (2) at least one organometallic compound having the formula $MR_n$, wherein M is a metal selected from the group consisting of lithium and magnesium, R is a hydrocarbon radical having from 1 to 12 carbon atoms and $n$ is a valence number of M, the molar ratio of (1) to (2) being from 1:0.2 to 1:10.

2. The process as claimed in claim 1, wherein said metal carboxylate is a metal naphthenate.

3. The process as claimed to claim 1, wherein said metal carboxylate is a metal 2-ethylhexanoate.

4. The process as claimed in claim 1, wherein said $\beta$-ketone is acetylacetone.

5. The process as claimed in claim 1, wherein said $\beta$-ketone is ethlylacetoacetate.

6. The process as claimed in claim 1, wherein said $\beta$-hydroxycarboxylic is 3,5-diisopropylsalicylic acid.

7. The process as claimed in claim 1, wherein said $\beta$-hydroxycarboxylic compound is salicylaldehyde.

8. The process as claimed in claim 1, wherein said organometallic compound is an alkyllithium compound.

9. The process as claimed in claim 8, wherein said alkyllithium compound is n-butyllithium 10. The process as claimed in claim 1, wherein said organometallic compound is a dialkymagnesium compound.

11. The process as claim in claim 10, wherein said dialkylmagnesium compound is diethylmagnesium.

12. The process as claimed in claim 1, wherein the pressure of said hydrogen is less than 10 atmospheres.

13. The process as claimed in claim 1, wherein said conjugated diene is butadiene.

14. The process as claimed in claim 1, wherein said conjugated diene is isoprene.

15. The process as claimed in claim 1, wherein said polymer is styrene-butadiene copolymer.

16. The process as claimed in claim 1, wherein said polymer is polybutadiene.

17. A process for the catalytic hydrogenation of a polymer having butadiene units, which comprises reacting butadiene units of the polymer as a solution in an inert solvent selected from the group consisting of a saturated hydrocarbon, an aromatic hydrocarbon and a hydroaromatic hydrocarbon with hydrogen of less than 10 atms. at a temperature of from 0° to 120° C. by the use of an effective amount of a catalyst soluble in said solution, the concentration of said polymer in said solution being from 1 to 30 percent by weight and said catalyst being obtained by mixing
   (1) at least one metal carboxylate having the formula $(R'COO)_{n'}M'$, wherein $M'$ is a metal selected from the group consisting of nickel, cobalt and iron, $R'$ is a hydrocarbon radical having from 5 to 30 carbon atoms $n'$ is a valence number of $M'$ and
   (2) at least one alkyllithium compound, alkyl radical of which has from 1 to 12 carbon atoms, the molar ratio of (1) to (2) being from 1:0.2 to 1:10.

References Cited

UNITED STATES PATENTS

| 2,813,809 | 11/1957 | Jones et al. | 260—94.7 XR |
| 2,864,809 | 12/1958 | Jones et al. | 260—94.7 XR |
| 2,911,395 | 11/1959 | Small | 260—96 XR |
| 3,130,237 | 4/1964 | Wald | 260—85.1 XR |
| 3,205,278 | 9/1965 | Lapporte | 260—667 |

JOSEPH L. SCHOFER, Primary Examiner

W. F. HAMROCK, Assistant Examiner

U.S. Cl. X.R.

260—82.1, 83.3, 94.7, 96, 690, 879; 252—431